United States Patent

[11] 3,542,157

[72] Inventor  Frederick G. Noah
              1022 Savage Creek Road, Grants Pass,
              Oregon 97526
[21] Appl. No. 798,875
[22] Filed     Feb. 13, 1969
[45] Patented  Nov. 24, 1970

[54] AUTOMATIC DOCK WHEEL CHOCK FOR TRAILERS
     6 Claims, 4 Drawing Figs.
[52] U.S. Cl. .................................................. 188/32
[51] Int. Cl. .................................................. B60t 3/00
[50] Field of Search ........................................ 188/4A, 32;
                                                  105/368; 248/119

[56]              References Cited
              UNITED STATES PATENTS
1,082,807  12/1913  Holworthy .................... 188/32
1,922,554  8/1933   McCosh ....................... 188/324X FOREIGN PATENTS
1,121,937  1/1962  Germany ...................... 188/32

Primary Examiner—George E. A. Halvosa
Attorney—Clarence A. O'Brien & Harvey B. Jacobson ABSTRACT: A portable self-contained wheel actuated trailer chocking device characterized, by a channel-type base, a rocker shaft and a wheel seating and cradling plate perched intermediate its ends atop the rocker shaft. When the trailer wheel rides over and is nested in the concave seating portion, the rearward half-portion of the plate tilts down and the forward half-portion is elevated and blocks retrograde movement of the captive trailer wheel. A pivoted retainer leg drops automatically behind a limit stop block and props the plate up. This plate stays put until intentionally freed by a manually controllable leg tripping latch.

Patented Nov. 24, 1970

3,542,157

Frederick G. Noah
INVENTOR.

BY *Clarence A. O'Brien*
and *Harvey B. Jacobson*
Attorneys

AUTOMATIC DOCK WHEEL CHOCK FOR TRAILERS

This invention relates to a portable self-contained trailer wheel positioning and blocking device or chock, more particularly, a uniquely constructed self-setting chock which lends itself to feasible and reliable use when it is properly located on a solid foundation or surface near the marginal edge of a loading and unloading elevated platform or dock and which features novel chock means which comes into play and stays put until the trailer-truck driver carries out the steps necessary to free the securely chocked wheel.

As is generally well known, when a tractor-trailer is parked adjacent a dock, for whatever purpose desired, the tractor is customarily disconnected and the trailer's air brakes or a makeshift wooden block-type chock serve to keep the trailer in place. However, and as is too often the case, the driver or his assistant may not carry out his duty of placing chocking blocks in front of the trailer wheels. Then, too, it is not unusual for air brakes to leak and fail to perform their intended function. Confronted with such difficulties it is the object of the present invention to provide a simple, practical and assuredly reliable device which will effectually cope with and solve the overall problem and will well serve the purposes for which it has been devised.

In addition to the above broadly stated conditions it is a matter of significance to take into account the fact that a heavy forklift when backing out of the trailer tends to forcibly push the bed of the trailer away from the edge of the dock or platform and, as experience has shown, the space then existing between the trailer and the dock is often such that the forklift and seated operator can crash down to the ground and bring about every varying difficulties and injury to the operator. It follows that a primary purpose of the present invention is to prevent retrograde movement of the trailer wheels and to reliably prevent the trailer from accidentally shifting away from the dock. To the ends desired, the invention is such in construction and capability that it constitutes a safeguarding trailer anchoring and blocking device.

When two of the devices are pared and properly located relative to each other, the dock and the trailer, the likelihood that the trailer would accidentally displace itself from its chocked position, because of failure of the air brakes to hold, is reduced to a practical minimum. With this invention in use there is minimal chance that a driver would forget to block the wheels for the reason that the chocking and blocking result is achieved automatically, that is, when the trailer wheels have been properly lined up with and guidingly backed over the self-setting wheel seating and cradling plates. It is also a matter of importance to take under consideration the fact that the invention is a time and labor saving device and includes a novel pivotally mounted latch which must be released manually. Accordingly, there is little or no chance of the driver pulling out while a forklift is operating in and out of the rearward loading and unloading end of the trailer.

Briefly, the wheel chocking device herein disclosed is characterized by a portable elongated base, preferably a base which is channel-shaped in cross section with the result that the open ended channel provides a wheel guiding track. The flanges forming the side walls of the channel are provided intermediate the rearward and forward ends of the track with a transversely disposed rocker shaft. This rocker shaft has its headed or peened ends rotatable in bearing holes provided therefor in the associated flanges. The wheel seating and cradling member, more specifically an arcuately bowed plate, has a median portion perched and fixed atop the shaft with the result that the half-portions are properly oriented and balanced. The thus mounted plate is load-responsive and is capable of being shifted from an inactive chocked initial position to a subsequent wheel-chocking trailer retaining position. Elevating and retaining means is carried by the forward end of the plate and is preferably in the form of a properly proportioned leg. The upper end of the leg is pivotally joined to the forward end of the plate and the lower end is free and is capable of automatically riding over and dropping behind an abutment or block which functions as a limit stop shoulder for the leg. The leg is unique in that it is provided on its median underside with a complemental latch, said latch being hingedly connected at its upper end to the leg and having its lower end free, said lower end being so constructed and arranged that it can be manually engaged with a lug or detent on the underneath side of the plate whereby it is thus necessary for the driver, or other user, to intentionally bring the latch into play and to move the leg to an out-of-the-way position when the trailer is intentionally moved out and away from the dock.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 2:
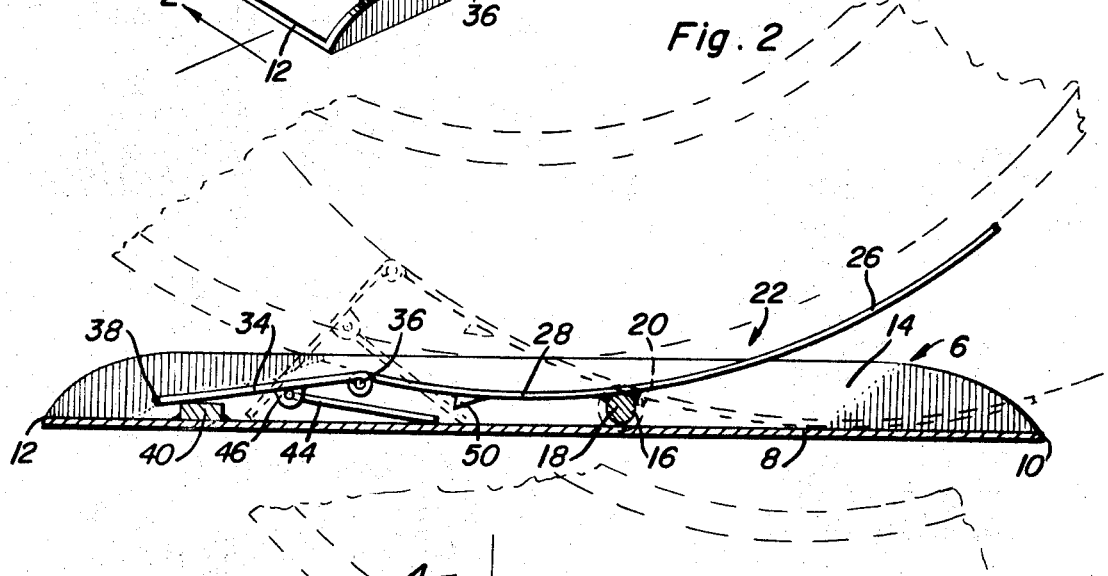
FIG. 2 is a longitudinal sectional view on a slightly enlarged scale taken approximately on the plane of the section line 2–2 of FIG. 1 looking in the direction of the arrows.
Figure 3:
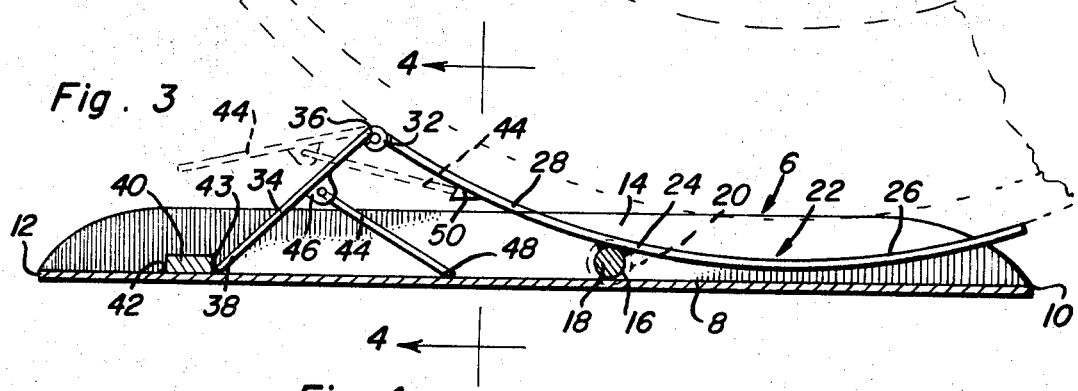
FIG. 3 is a view similar to and based on FIG. 2 and showing the wheel seating and cradling plate in its locked position.
Figure 4:
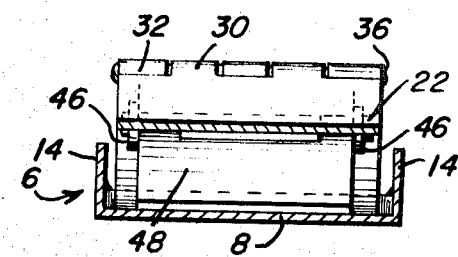

And FIG. 4 is a view at right angles to FIGS. 2 and 3 taken approximately on the plane of the vertical line 4–4 of FIG. 3.

The aforementioned base is denoted by the numeral 6 and is of elongated form, is rigid in construction, made from suitable reliable strong material and of the shape and dimension suggested in the views of the drawing. More specifically, this base is in the form of an open ended channel. Stated otherwise, it is channel-shaped in cross section and comprises a flat web or bottom 8 whose rearward end is denoted by the numeral 10. In actual practice this is the end of the channel which is located adjacent or proximal to the edge of the elevated platform or dock (not shown). The opposite or forward end is denoted at 12. The terms "rearward" and "forward" are used here in relation to the forward and rearward end portions of the trailer (also not shown). The spaced parallel duplicate upstanding flanges, which constitute the side walls of the channel, are denoted at 14. Intermediate portions of the flanges between the ends 10 and 12 are provided with oppositely aligned holes which constitute bearings 16 for end portions of a horizontal transverse rocker shaft 18. This shaft spans the space between the flanges 14 and has headed end portions 20 held in place in the manner shown. This rocker shaft provides support means for the longitudinally bowed wheel seating and cradling member, more specifically, the elongated arcuately bowed plate 22. A median portion 24 of the plate is perched and fixed atop the rocker shaft 18 thus providing a half-portion 26 to the right and a similar half-portion 28 to the left of the rocker shaft. The forward end portion of the plate is provided with suitably bent and spaced knuckles 30 which are aligned with cooperating knuckles 32 carried by an end of a plate-type leg 34. These knuckles serve to accommodate a pintle 36 thus interconnecting the leg 34 with the rocker or plate 22.

Figure 1:
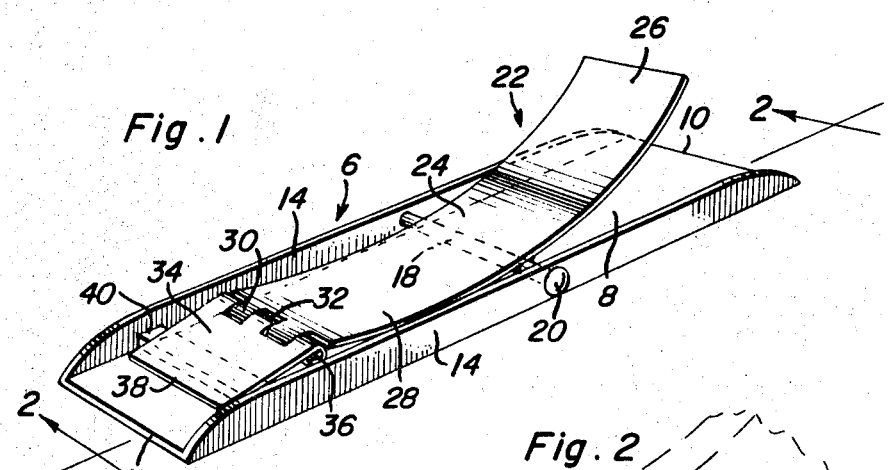
FIG. 1 is a view in perspective of a wheel chock for trailers constructed in accordance with the principles of the invention showing the component parts in the initial cocked or ready-to-use position and relationship.

When the device is in its initial ready-to-use or cocked position, the plate 22 and the leg 34 assume the relationship illustrated in FIG. 1.

In order to achieve the automatic blocking and chocking result desired and illustrated in full lines in FIG. 3, it will be noted that the leg 34 constitutes a prop with the result that the free lower end portion 38 assumes the upwardly and rearwardly inclined position also shown in FIG. 3. For best results, it has been found advisable to employ a simple abutment, more specifically, a transverse block 40 which is welded or otherwise secured in place as at 42. The right hand or rearward edge portion 43 of the block constitutes a limit stop shoulder and when the leg is in the elevating position shown in FIG. 3 it is engaged with the shoulder 43. The safety aspect of the overall concept is aptly achieved by employing an auxiliary leg which is here referred to as a latch 44 and which is proportional in size and shape and has one end portion provided with pintles hingedly mounted in attaching ears 46 on the underneath side of the median part of the leg 34. The free end of this latch, that is the end denoted at 48 is releasably engageable with a lug 50 mounted on the underneath side of the plate 22. This latch is shown in one position in FIG. 2, and in a second position in FIG. 3. These may be considered as the ineffective positions of the latch. When the latch is brought into play it is manually lifted up from the full line position shown in FIG. 3 to the dotted line position whereupon the end 48 is positioned against the detent or keeper 50 during which time the leg 34 is then held in an up and out-of-the-way position as shown in phantom lines.

It will be evident from the views of the drawing and the description that the chock has been devised and perfected with the idea in mind of preventing a trailer from accidentally moving away from the dock with which it is cooperable. The trailer, when backing over the chock moves the tiltable and cradling and wheel seating plate 22 into the locked position shown in will not 3. The trailer when backing over the chock moves the parts into this desirable locked position and the parts will not unlock until the driver of the truck gets out and manipulates the latch means 44 to achieve the released position shown in phantom lines in FIG. 3. The invention is not intended to position the trailer in any particular way but presents any accidental movement of the trailer while forklifts (not shown) are operating in and out of the trailer. When the chock has been released the action of the trailer which is being pulled off the chock automatically sets it so that the next trailer that backs over it is then locked against the dock.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. For use when temporarily parking a tractor drawn wheeled trailer adjacent the platform of a loading and unloading dock, a wheel chocking device comprising, in combination, an elongated base adapted to be placed in a ready-to-use position atop the parking surface, a one-piece wheel seating and cradling member of a length less than and aligned with and pivotally and rockably mounted intermediate its ends atop said base intermediate its respective forward and rearward ends, said member being wheel actuated and load responsive and automatically shiftable from an inactive cocked position substantially within the confines of said base to a wheel-chocking trailer retaining position, and elevating and retaining means carried by said member and automatically but releasably engageable with an abutment which is fixedly mounted atop said base, said base being channel-shaped, the channel thereof providing an open-ended wheel guiding and positioning track and embodying a wholly flat horizontal web interconnecting a pair of relatively short upstanding vertical wheel confining and guiding flanges of equal height, said abutment comprising a block fixed atop said web and extending transversely across the top surface of the web and coacting with said flanges and an edge thereof providing a limit stop shoulder for said elevating and retaining means, said wheel seating and cradling member comprising an arcuately bowed rigid plate the arcuate curvature of which is conformable to the curvature of that portion of the tire which is nested and seated therein, said retaining means comprising a rigid leg of prescribed length and width having an upper end hingedly joined to a forward end of said plate and a free lower end which is retentively but releasably engageable with said limit stop shoulder.

2. The wheel chocking device defined in and according to claim 1, and wherein said leg constitutes a plate elevating and setting prop, said lower end being automatically engageable with the limit stop shoulder when the trailer wheel is nested and cradled in the seating and chocking plate, and a manually actuable and controllable leg tripping latch having one end pivotally joined to a median portion of said leg and a free end portion which is adapted to be releasably engaged with a detent therefor which is fixed on a coacting underneath surface of said plate in a manner to set the leg in an elevated out-of-the-way position.

3. An automatic trailer wheel actuated chocking and docking device comprising a portable elongated tracklike base channel-shaped in cross section, the channel of said base being open at its forward and rearward ends and embodying a flat horizontal web connecting a pair of relatively short upstanding spaced parallel wheel confining and guiding flanges, a rigid one-piece elongated arcuately bowed wheel seating and cradling plate of a length less than the length of and spaced within the limits of said base, the arcuate curvature of said plate being conformable with the curvature of the tread portion of the tire which is adapted to nest and seat itself conformingly atop said plate, a rocker shaft extending transversely across a median portion of the channel and having end portions journaled for angular rotation in bearing holes provided therefor in the respectively cooperable flanges, a median portion of the underneath convex surface of said plate being fixed atop and rockable in unison with said shaft, the respective half-portions of said plate extending forwardly and rearwardly, respectively, of said rocker shaft and being tiltably load-responsive when the wheel is seated in a predetermined manner atop the concave surface portion of said plate, an abutment block fixed atop a forward end portion of said web and providing a limit stop shoulder, and a rigid depending plate-elevating and propping leg having an upper end hingedly mounted on a cooperating end of said plate and a free lower end which is releasably engageable with said limit stop shoulder.

4. The trailer wheel chocking device defined in and according to claim 3, and wherein said plate provided on an underneath surface with a fixed depending keeper-type lug, said lug being spaced from cooperating end and providing a detent, and a manually actuable and controllable leg tripping safety latch having an upper end pivotally joined to a median portion of said leg and a lower free end portion which is adapted to be releasably engaged with said detent whenever necessary or desired, whereby to position and hold the leg in an out-of-the-way position.

5. The trailer wheel chocking device defined in and according to claim 4, and wherein said latch is of a transverse corss-sectional dimension greater than the distance between the pivot point of said latch and locale of said detent that, when in use, it elevates and maintains said leg in said out-of-the-way position until said latch is manually released from said detent.

6. The trailer wheel chocking device defined in and according to claim 5, and wherein said leg is of a transverse cross-sectional dimension greater than the distance between the pivot point and the limit stop shoulder when the plate is in a normal ready-to-function position.